US010941729B2

(12) United States Patent
Oberle (10) Patent No.: US 10,941,729 B2
(45) Date of Patent: Mar. 9, 2021

(54) NACELLE OF A TURBOJET ENGINE COMPRISING AN OUTER THRUST-REVERSING DOOR

(71) Applicant: Airbus SAS, Blagnac (FR)

(72) Inventor: Patrick Oberle, Verdun sur Garonne (FR)

(73) Assignee: AIRBUS SAS, Blagnac (FR)

( * ) Notice: Subject to any disclaimer, the term of this patent is extended or adjusted under 35 U.S.C. 154(b) by 123 days.

(21) Appl. No.: 16/253,035

(22) Filed: Jan. 21, 2019

(65) Prior Publication Data
US 2019/0242329 A1     Aug. 8, 2019

(30) Foreign Application Priority Data

Feb. 5, 2018 (FR) ........................................ 1850928

(51) Int. Cl.
*F02K 1/76* (2006.01)
*F02K 1/70* (2006.01)
*F02K 1/72* (2006.01)
*B64D 29/06* (2006.01)
*F02K 1/56* (2006.01)
*F02K 1/60* (2006.01)

(52) U.S. Cl.
CPC .............. *F02K 1/763* (2013.01); *B64D 29/06* (2013.01); *F02K 1/563* (2013.01); *F02K 1/60* (2013.01); *F02K 1/70* (2013.01); *F02K 1/72* (2013.01); *F02K 1/766* (2013.01); *F05D 2260/50* (2013.01)

(58) Field of Classification Search
CPC ... F02K 1/60; F02K 1/605; F02K 1/62; F02K 1/625; F02K 1/70; F02K 1/72; F02K 1/763; F02K 1/80; B64D 29/06; F05D 2260/50
See application file for complete search history.

(56) References Cited

U.S. PATENT DOCUMENTS

| 3,815,357 A | 6/1974 | Brennan | |
|---|---|---|---|
| 2007/0007388 A1* | 1/2007 | Harrison | ................. F02K 1/766 244/110 B |
| 2012/0138707 A1* | 6/2012 | Vauchel | ................. F02K 1/763 239/265.29 |

(Continued)

FOREIGN PATENT DOCUMENTS

| EP | 2573375 A2 | 3/2013 |
|---|---|---|
| WO | 2016146936 A1 | 9/2016 |

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

A nacelle for a dual-flow turbojet engine comprises a structure, a fixed cowl, a cowl translationally mobile on the structure, a window open between a secondary jet and the outside of the nacelle, and delimited by the fixed and mobile cowls, an outer thrust-reversing door rotationally mobile and a driving mechanism. The driving mechanism comprises a single power cylinder arranged at the level of a median plane and having a first end mounted articulated on the structure, a shaft with the second end of the power cylinder mounted articulated on the shaft, a first yoke joint secured to the outer thrust-reversing door and free to rotate on the shaft, and a second yoke joint secured to the mobile cowl, and where each of the two flanks of the second yoke joint has a groove in each of which the shaft is mounted to slide parallel to the median plane.

8 Claims, 4 Drawing Sheets

(56) References Cited

U.S. PATENT DOCUMENTS

| | | | |
|---|---|---|---|
| 2013/0062434 A1* | 3/2013 | Vauchel | F16C 7/02 |
| | | | 239/265.19 |
| 2013/0067884 A1 | 3/2013 | Bhatt | |
| 2017/0174353 A1* | 6/2017 | Joret | B64D 29/06 |
| 2018/0112626 A1 | 4/2018 | Lerouvreur et al. | |
| 2018/0216574 A1* | 8/2018 | Haramburu | F02K 1/72 |

\* cited by examiner

NACELLE OF A TURBOJET ENGINE COMPRISING AN OUTER THRUST-REVERSING DOOR

CROSS-REFERENCES TO RELATED APPLICATIONS

This application claims the benefit of the French patent application No. 1850928 filed on Feb. 5, 2018, the entire disclosures of which are incorporated herein by way of reference.

FIELD OF THE INVENTION

The present invention relates to a nacelle of a dual-flow turbojet engine which comprises at least one outer thrust-reversing door, a dual-flow turbojet engine comprising such a nacelle and an engine, as well as an aircraft comprising at least one such dual-flow turbojet engine.

BACKGROUND OF THE INVENTION

An aircraft comprises a fuselage, on each side of which is fixed a wing. Under each wing, there is suspended at least one dual-flow turbojet engine. Each dual-flow turbojet engine is fixed under the wing via a pylon which is fixed between the structure of the wing and the structure of the dual-flow turbojet engine.

The dual-flow turbojet engine comprises an engine and a nacelle which is fixed around the engine.

The nacelle comprises at least one thrust-reversing door which is rotationally mobile on the structure of the nacelle between a closed position in which it comes into continuity with the outer surface of the nacelle and an open position in which it opens a window in the wall of the nacelle to expel the air of the secondary flow outwards.

Thus, in open position, the thrust-reversing door diverts a part of the secondary flow outwards through the window.

Although the mechanism of such a thrust-reversing door gives full satisfaction, it is desirable to find different mechanisms.

SUMMARY OF THE INVENTION

One object of the present invention is to propose a nacelle comprising at least one outer thrust-reversing door with a different opening mechanism.

To this end, a nacelle is proposed for a dual-flow turbojet engine, said nacelle comprising:
  a structure,
  a fixed cowl fixedly mounted on the structure,
  a mobile cowl mounted to be translationally mobile on the structure in a direction of translation between a position of closure in which it is close to the fixed cowl and a position of opening in which it is away from the fixed cowl towards the rear,
  a window delimited upstream by the fixed cowl and downstream by the mobile cowl, said window being open between a jet of a secondary flow and the outside of the nacelle,
  an outer thrust-reversing door having a median plane and mounted to be rotationally mobile about a first axis of rotation on the structure between a closed position in which it blocks the window and an open position in which it does not block the window, and
  a driving mechanism provided to coordinate the transition from the closed position to the open position of the outer thrust-reversing door with the transition from the position of closure to the position of opening of the mobile cowl and vice-versa, said driving mechanism comprising:
  a single power cylinder arranged at the level of the median plane, having a first end mounted articulated on the structure,
  a shaft having an axis, called third axis of rotation, parallel to the first axis of rotation and at a distance therefrom, and where the second end of the power cylinder is mounted articulated on the shaft,
  a first yoke joint secured to the outer thrust-reversing door and mounted to be free to rotate on the shaft about the third axis of rotation, and
  a second yoke joint secured to the mobile cowl and where each of the two flanks of the second yoke joint has a groove in each of which the shaft is mounted to slide parallel to the median plane.

Advantageously, for each groove, the shaft bears a wheel which rolls in said groove.

Advantageously, the outer thrust-reversing door has, at the level of its median plane, a void in which the power cylinder lodges in closed position of the outer thrust-reversing door.

Advantageously, the nacelle comprises blocking means arranged to prevent the outer thrust-reversing door from exceeding a maximum position of opening.

Advantageously, the nacelle comprises an inner thrust-reversing door arranged inside the nacelle relative to the outer thrust-reversing door and mounted to be rotationally mobile about a second axis of rotation on the structure between a retracted position in which it is positioned around the jet and an active position in which it is positioned across the jet, the driving mechanism comprises two guideways secured to the inner thrust-reversing door and which extend parallel to the direction of translation of the mobile cowl when the inner thrust-reversing door is in retracted position, each guideway has a distal end oriented towards the front of the nacelle and a proximal end oriented towards the rear of the nacelle, and the driving mechanism comprises, for each guideway, a runner secured to the mobile cowl and provided to be able to be displaced in the guideway between the distal end and the proximal end.

Advantageously, the inner thrust-reversing door has, at the level of its median plane, a notch which allows the passage of the power cylinder.

The invention also proposes a dual-flow turbojet engine comprising an engine and a nacelle according to one of the preceding variants surrounding the engine, and in which a jet of a secondary flow is delimited between the nacelle and the engine.

The invention also proposes an aircraft comprising at least one dual-flow turbojet engine according to the preceding variant.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION OF THE PREFERRED EMBODIMENTS

Figure 1:
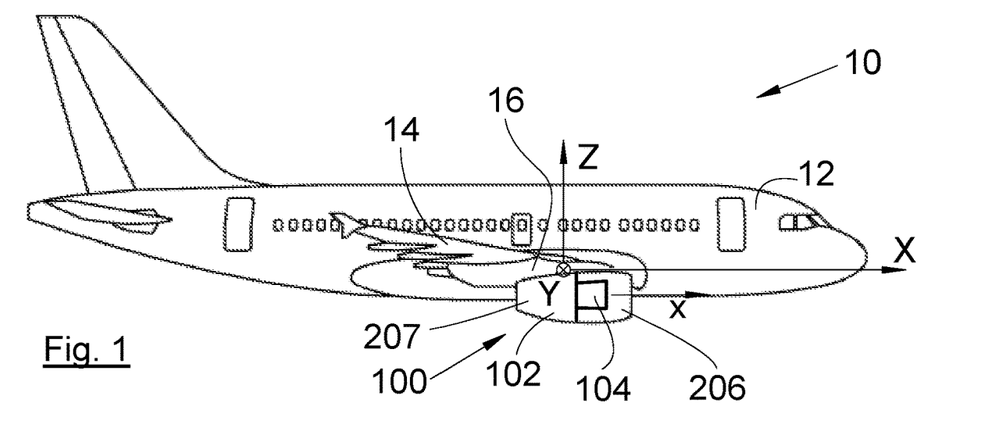
FIG. 1 is a side view of an aircraft comprising a nacelle according to the invention.

In the following description, the terms relating to a position are taken with reference to an aircraft in position of advance as is represented in FIG. 1.

FIG. 1 shows an aircraft 10 which comprises a fuselage 12, on each side of which is fixed a wing 14 which bears at least one dual-flow turbojet engine 100 according to the invention. The fixing of the dual-flow turbojet engine 100 under the wing 14 is made via a pylon 16.

Figure 2:
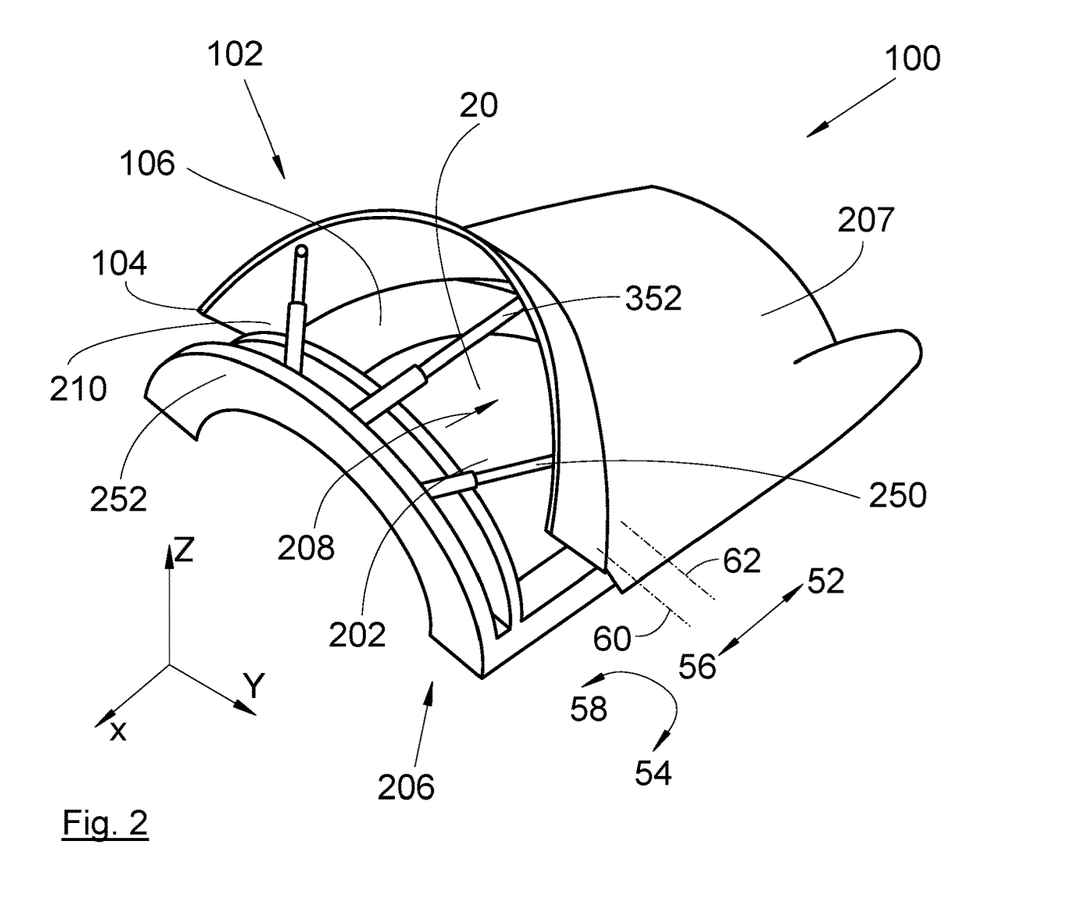
FIG. 2 is a perspective view of the nacelle according to the invention in open position.

FIG. 2 shows a nacelle 102 according to the invention.

The dual-flow turbojet engine 100 comprises a nacelle 102 and an engine 20 which is housed inside the nacelle 102.

As is shown in FIG. 2, the dual-flow turbojet engine 100 has a jet 202 between the nacelle 102 and the engine 20 in which the secondary flow 208 circulates.

Hereinafter in the description, and by convention, x denotes the longitudinal axis of the nacelle 102 which is parallel to the longitudinal axis X of the aircraft 10, or roll axis, oriented positively in the direction of advance of the aircraft 10, Y denotes the transverse axis or pitch axis of the aircraft which is horizontal when the aircraft is on the ground, and Z denotes the vertical axis or vertical height or yaw axis when the aircraft is on the ground, these three directions X, Y and Z being mutually orthogonal and forming an orthonormal reference frame whose origin is the center of gravity of the aircraft.

The nacelle 102 comprises at least one outer thrust-reversing door 104. In particular, there can be two outer thrust-reversing doors 104 arranged facing one another, or four outer thrust-reversing doors 104 distributed regularly on the periphery of the nacelle 102.

In the following description, the invention is described more particularly for one outer thrust-reversing door 104, but it applies equally for each outer thrust-reversing door 104 when there are several thereof.

For each outer thrust-reversing door 104, the nacelle 102 comprises an inner thrust-reversing door 106 arranged inside the nacelle 102 relative to the outer thrust-reversing door 104. As is explained hereinbelow, the inner thrust-reversing door 106 and the outer thrust-reversing door 104 make it possible to deflect the secondary flow 208 towards the front of the aircraft 10 for slowing down.

The nacelle 102 has, for each pair composed of an outer thrust-reversing door 104 and an inner thrust-reversing door 106, an open window 210 between the jet 202 and the outside of the nacelle 102.

The nacelle 102 has a fixed cowl 206 which delimits the window 210 upstream relative to the longitudinal axis x and which is fixedly mounted on a structure of the nacelle 102.

The nacelle 102 has a mobile cowl 207 which delimits the window 210 downstream relative to the longitudinal axis x. The mobile cowl 207 is mounted to be translationally mobile on the structure in a direction of translation that is globally parallel to the longitudinal axis x on the structure of the nacelle 102. The translation is performed by any appropriate means such as, for example, guideways between the structure of the nacelle 102 and the mobile cowl 207.

The fixed cowl 206 and the mobile cowl 207 have an outer surface which constitutes the outer jacket of the nacelle 102.

The mobile cowl 207 is mobile between a position of closure in which it is close to the fixed cowl 206 and a position of opening in which it is away from the fixed cowl 206 towards the rear so as to widen the window 210.

The outer thrust-reversing door 104 is mounted to be rotationally mobile about a first axis of rotation 60 on the structure of the nacelle 102 between a closed position in which it blocks the window 210 and an open position in which it does not block the window 210. In the embodiment of the invention presented in FIGS. 2 and 3, the first axis of rotation 60 is at right angles to the longitudinal axis x and is located at the level of the lateral ends of the outer thrust-reversing door 104.

Likewise, the inner thrust-reversing door 106 is rotationally mobile about a second axis of rotation 62 on the structure of the nacelle 102 between a retracted position in which it is positioned around the jet 202 and an active position in which it is positioned across the jet 202 to deflect the secondary flow 208 towards the window. In active position, the inner thrust-reversing door 106 thus extends the outer thrust-reversing door 104 in open position in the jet 202 to the engine 20 to best deflect the secondary flow 208. In the embodiment of the invention presented in the figs, the second axis of rotation 62 is, here, at right angles to the longitudinal axis x and is located at the level of the lateral ends of the inner thrust-reversing door 106.

In closed position, the outer thrust-reversing door 104 is positioned between the fixed cowl 206 and the mobile cowl 207 which is in position of closure and the outer thrust-reversing door 104 extends the mobile cowl 207, and the fixed cowl 206 extends the outer thrust-reversing door 104. In open position, the mobile cowl 207 is displaced towards the rear to facilitate the maneuvering of the outer thrust-reversing door 104 which switches from the closed position to the open position.

When the outer thrust-reversing door 104 is in closed position, the outer surface of the outer thrust-reversing door 104 extends between the outer surface of the fixed cowl 206 and the outer surface of the mobile cowl 207.

When the outer thrust-reversing door 104 is in open position, the outer thrust-reversing door 104 comes, at least partly, across the jet 202 and deflects at least a part of the secondary flow 208 to the outside through the window 210.

In retracted position, the inner thrust-reversing door 106 is positioned between the fixed cowl 206 and the mobile cowl 207 which is in position of closure and the inner thrust-reversing door 106 extends the mobile cowl 207, and the fixed cowl 206 extends the inner thrust-reversing door 106. In active position, the mobile cowl 207 is displaced towards the rear to facilitate the maneuvering of the inner thrust-reversing door 106 which switches from the retracted position to the active position.

When the inner thrust-reversing door 106 is in retracted position, the inner surface of the inner thrust-reversing door 106 extends between the inner surface of the fixed cowl 206 and the inner surface of the mobile cowl 207 to constitute the outer wall of the jet 202.

When the inner thrust-reversing door 106 is in active position, the inner thrust-reversing door 106 comes across the jet 202 and deflects at least a part of the secondary flow 208 towards the window 210.

Figure 3:
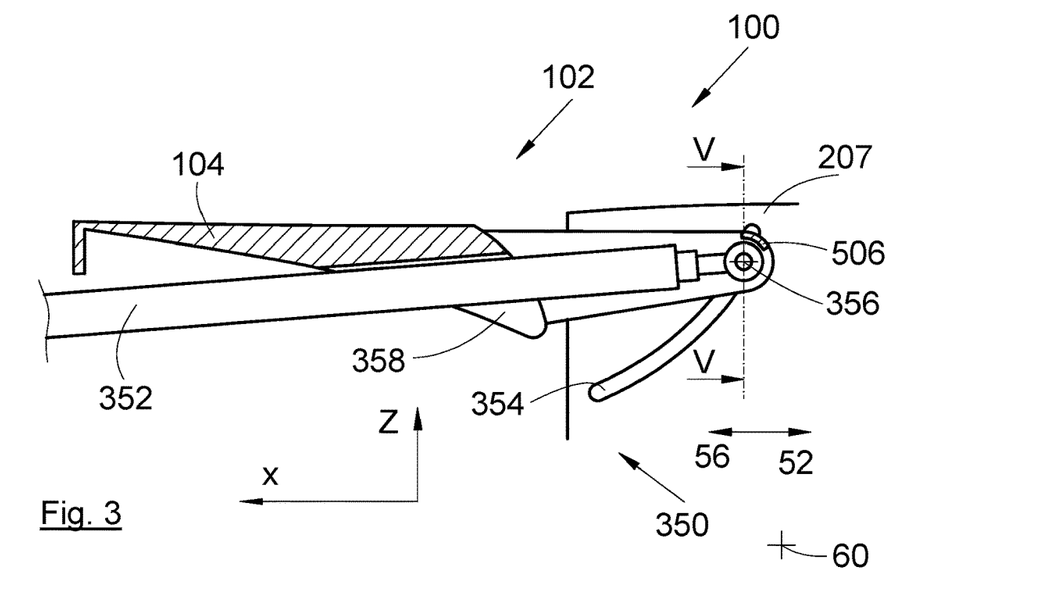
FIG. 3 is a cross section through a radial plane of an outer thrust-reversing door in closed position of the nacelle according to the invention.
Figure 4:
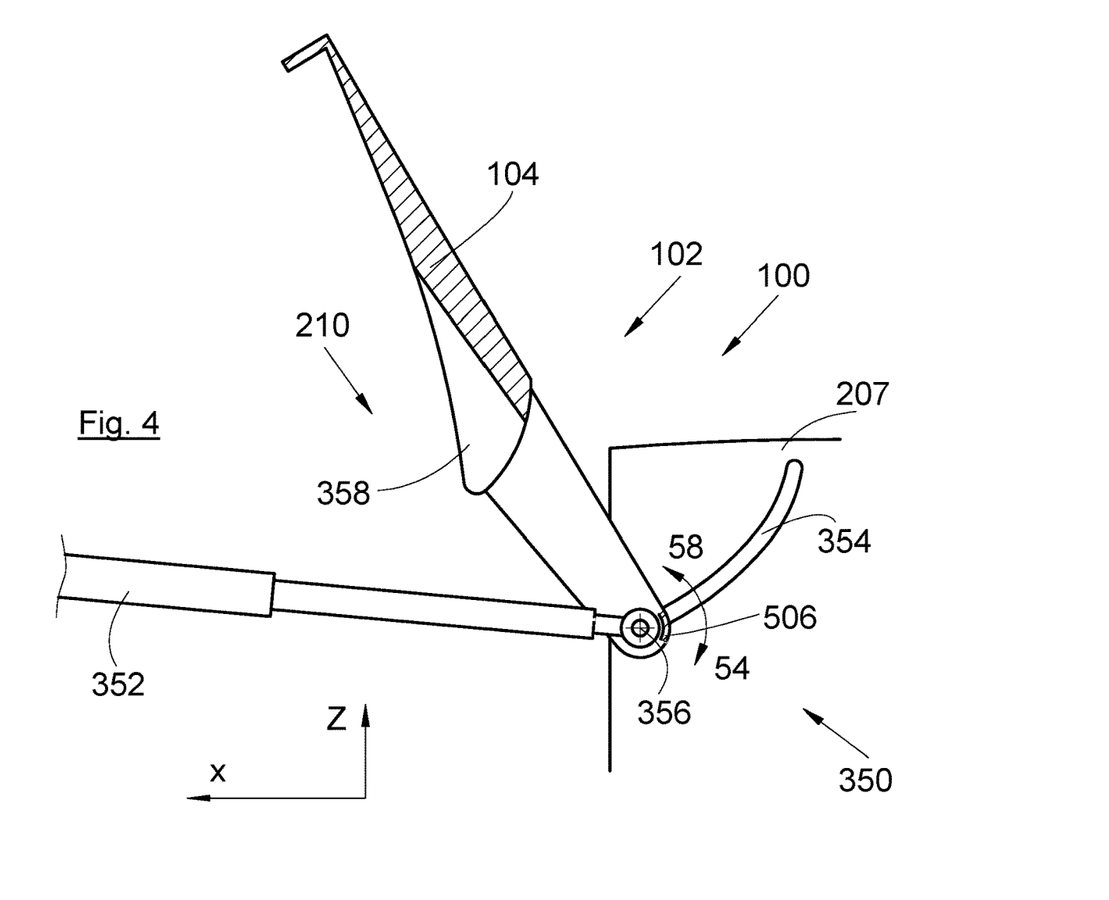
FIG. 4 is a view similar to FIG. 3 in open position of the outer thrust-reversing door.

FIGS. 3 and 4 show the coordination between the transition from the closed position to the open position of the outer thrust-reversing door 104 with the transition from the position of closure to the position of opening of the mobile cowl 207.

Figure 5:
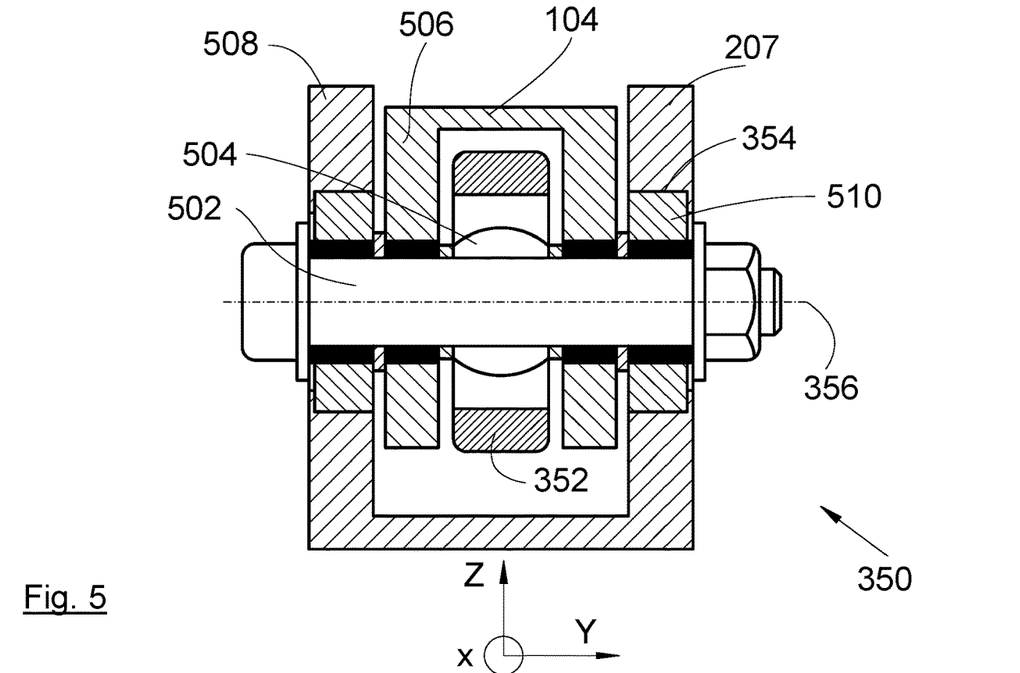
FIG. 5 shows a cross section along the line V-V of FIG. 3.

This coordination is ensured by a driving mechanism 350 and FIG. 5 shows a detail of the driving mechanism 350.

The driving mechanism 350 produces, from the closed position and from the position of closure, a first combination ensuring:
- a translation towards the rear (arrow 52) of the mobile cowl 207 in a direction of translation that is globally parallel to the longitudinal axis x which ensures the displacement of the mobile cowl 207 from the position of closure to the position of opening, and
- a rotation (arrow 54) of the outer thrust-reversing door 104 about the first axis of rotation 60 which ensures the displacement of the outer thrust-reversing door 104 from the closed position to the open position.

Conversely, the transition from the open position to the closed position of the outer thrust-reversing door 104 is ensured by the same driving mechanism 350 which is also provided to produce a second combination ensuring, from the open position and from the position of opening:
- a rotation (arrow 58) in the reverse direction of the outer thrust-reversing door 104 about the first axis of rotation 60 which ensures the return of the outer thrust-reversing door 104 from the open position to the closed position, and
- a translation towards the front (arrow 56) of the mobile cowl 207 in the direction of translation which ensures the displacement of the mobile cowl 207 from the position of opening to the position of closure.

The driving mechanism 350 comprises a single power cylinder 352 arranged at the level of a median plane xZ of the mobile cowl 207 that is globally parallel to the plane xZ in order to ensure a balanced displacement of the mobile cowl 207. The median plane of the mobile cowl 207 corresponds also to the median plane of the outer thrust-reversing door 104 and of the inner thrust-reversing door 106. The power cylinder 352 can be electrical, hydraulic, pneumatic or the like. The driving mechanism 350 comprises a control unit, of processor type, which controls the extending and the shortening of the power cylinder 352 according to the needs of the aircraft 10.

The power cylinder 352 has a first end, here the cylinder of the power cylinder 352, which is mounted articulated on the structure of the nacelle 102, in particular with the front frame 252.

A second end of the power cylinder 352, here the rod of the power cylinder 352, is mounted articulated on the outer thrust-reversing door 104 about a third axis of rotation 356 parallel to the first axis of rotation 60 and at a distance therefrom as shown in FIG. 3.

To this end, the driving mechanism 350 comprises a shaft 502 that is coaxial with the third axis of rotation 356 and on which the second end of the power cylinder 352 is mounted articulated, here via a ball joint 504.

The driving mechanism 350 also comprises a first yoke joint 506 which is secured to the outer thrust-reversing door 104 and which is mounted to be free to rotate on the shaft 502 in order to produce the free rotation of the outer thrust-reversing door 104 about the third axis of rotation 356. The shaft 502 is thus fitted into the two bores of the first yoke joint 506.

The mobile cowl 207 has two grooves 354 in which the shaft 502 is mounted to slide parallel to the median plane xZ. To this end, the driving mechanism 350 has a second yoke joint 508 secured to the mobile cowl 207 and outside of the first yoke joint 506, of which each of the two flanks has a groove 354. Each groove 354 is in a plane parallel to the median plane xZ.

The central positioning of the power cylinder 352 and the presence of the two yoke joints 506 and 508 make it possible to balance and minimize the forces in play.

In order to ensure a better sliding of the shaft 502 in the grooves 354, for each groove 354, the shaft 502 bears a wheel 510 which rolls in said groove 354.

In order to ensure a better rotation of the different elements on the shaft 502, bearing bushings can be provided around the shaft 502 and washers can be provided between the different elements.

The operation then consists, from the closed position and from the position of closure, in actuating the power cylinder 352 to extend it which drives the displacement of the outer thrust-reversing door 104 through action of the power cylinder 352 on the first yoke joint 506, and of the mobile cowl 207 through action of the shaft 502 and, here, of the wheels 510 which are displaced with the power cylinder 352 on the grooves 354.

The mobile cowl 207 is thus displaced from the position of closure to the position of opening and, at the same time by virtue of the displacement of the third axis of rotation 356 relative to the first axis of rotation 60, the outer thrust-reversing door 104 pivots about the first axis of rotation 60 from the closed position to the open position.

The form of each groove 354 is appropriate for following the displacement of the shaft 502 during the extension of the power cylinder 352. Each groove 354 is, here, curved and proceeds from the outside to the inside of the nacelle 102 by proceeding from the rear to the front of the nacelle 102. Obviously, depending on the geometries of the different elements, the form of each groove 350 can be different.

In order to allow a good positioning of the outer thrust-reversing door 104 and avoid the interactions with the power cylinder 352, the outer thrust-reversing door 104 has, at the level of its median plane, a void 358 in which the power cylinder 352 lodges in closed position of the outer thrust-reversing door 104.

In order to avoid an excessive displacement of the outer thrust-reversing door 104 in open position because of wind resistance, blocking means 250 are arranged to prevent the outer thrust-reversing door 104 from exceeding a maximum position of opening. The blocking means 250 can be abutments against which the outer thrust-reversing door 104 bears in maximum position of opening, but in the embodiment of the invention presented in FIG. 2, the blocking means 250 take the form of two telescopic rods which have a maximum extension when the outer thrust-reversing door 104 is in maximum position of opening.

Figure 6:
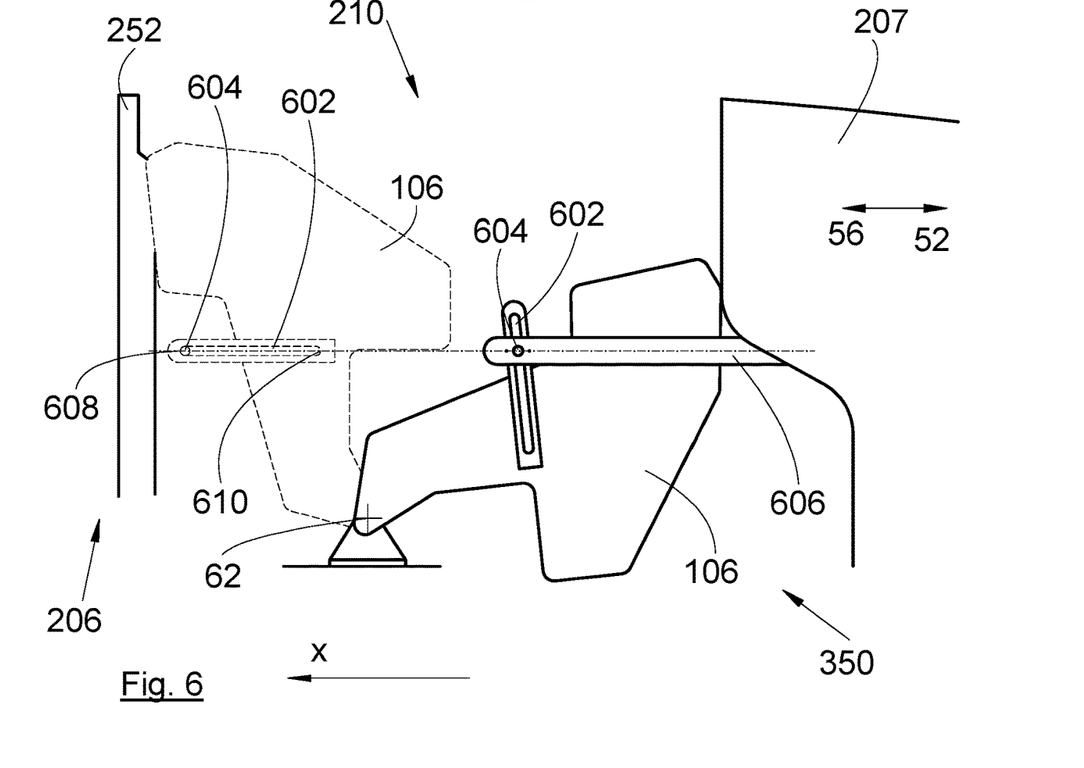
FIG. 6 is a side view of an inner thrust-reversing door of the nacelle according to the invention in open position and in closed position.

FIG. 6 shows the displacement of the inner thrust-reversing door 106 from the retracted position (in dotted lines) to the active position (in solid lines) which is produced by the driving mechanism 350.

The displacement of the inner thrust-reversing door 106 consists in a rotation about the second axis of rotation 62.

The driving mechanism 350 is provided for the rotation of the inner thrust-reversing door 106 to begin a certain time after the start of the translational displacement of the mobile cowl 207. Thus, from the position of closure and from the retracted position, the driving mechanism 350 first of all produces the translation towards the rear (arrow 52) of the mobile cowl 207 as explained above, then, after a certain time, a rotation (arrow 64) of the inner thrust-reversing door 106 about the second axis of rotation 62 which ensures the displacement of the inner thrust-reversing door 106 from the retracted position to the active position while the movement towards the rear of the mobile cowl 207 continues to the position of opening. Thus, from the position of opening and from the active position, the driving mechanism 350 produces the translation towards the front (arrow 56) of the mobile cowl 207 as explained above and a rotation (arrow 68) of the inner thrust-reversing door 106 about the second axis of rotation 62 from the active position to the retracted position, and, when the inner thrust-reversing door 106 is in the retracted position, it stops and the movement towards the front of the mobile cowl 207 continues to the position of closure.

Likewise, the displacement of the inner thrust-reversing door 106 from the retracted position to the active position is offset relative to the displacement of the outer thrust-reversing door 104 from the closed position to the open position.

Figure 7:
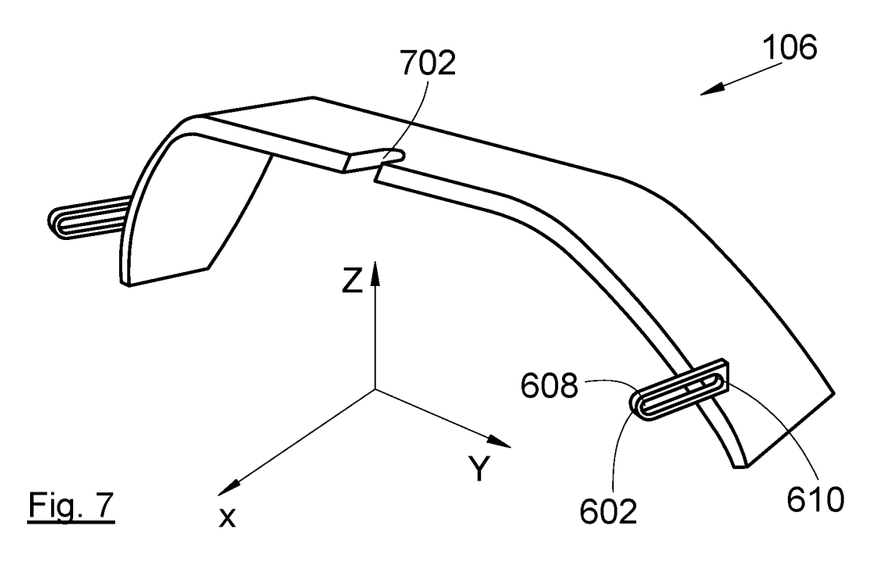
FIG. 7 is a perspective view of a part of the inner thrust-reversing door.

As FIG. 7 also shows, the driving mechanism 350 comprises two guideways 602 secured to the inner thrust-reversing door 106 and which extend parallel to the direction of translation of the mobile cowl 207 when the inner thrust-reversing door 106 is in retracted position. Each guideway 602 has a distal end 608 oriented towards the front of the nacelle 102 and a proximal end 610 oriented towards the rear of the nacelle 102.

The guideways 602 are, here, arranged at the level of the lateral ends of the inner thrust-reversing door 106.

For each guideway 602, the driving mechanism 350 also comprises a runner 604 secured to the mobile cowl 207, here via an arm 606 which is represented only in position of opening of the mobile cowl 207.

The runner 604 which, here, takes the form of a block, is provided to be able to be displaced in the guideway 602 between the distal end 608 and the proximal end 610.

As can be seen in FIG. 6, the runner 604 is against the distal end when the inner thrust-reversing door 106 is in retracted position and the mobile cowl 207 is in position of closure.

In addition to the operation described for the outer thrust-reversing door 104, the operation thus consists, from the closed/closure/retracted position, in actuating the power cylinder 352 to extend it, which drives the displacement of the outer thrust-reversing door 104 and of the mobile cowl 207, and of the runner 604 which is displaced in the direction of translation from the distal end 608 to the proximal end 610. Throughout this displacement, the inner thrust-reversing door 106 remains immobile. When the runner 604 reaches the proximal end 610, the continuation of the extension of the power cylinder 352 drives the switchover of the inner thrust-reversing door 106 by virtue of the runner 604 which is captive to the guideway 602. The switchover of the inner thrust-reversing door 106 continues to the active position as long as the power cylinder 352 is extended and the mobile cowl 207 reaches the position of opening.

Conversely, from the open/opening/active position, the power cylinder 352 shortens, which drives the displacement of the outer thrust-reversing door 104 and of the mobile cowl 207, and of the runner 604 which is captive to the guideway 602, which drives the switchover of the inner thrust-reversing door 106 to its retracted position. When the retracted position is reached, the runner 604 is displaced in the direction of translation from the proximal end 610 to the distal end 608. Throughout this displacement, the inner thrust-reversing door 106 remains immobile while the power cylinder 352 continues to shorten, driving the outer thrust-reversing door 104 to its closed position and the mobile cowl 207 to its position of closure.

In order to avoid the interactions between the inner thrust-reversing door 106 and the power cylinder 352 in the switchover of the inner thrust-reversing door 106, the latter has, at the level of its median plane, a notch 702 which allows the passage of said power cylinder 352.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a dual-flow turbojet engine, said nacelle comprising:
   a structure,
   a fixed cowl fixedly mounted on the structure,
   a mobile cowl mounted to be translationally mobile on the structure in a direction of translation between a position of closure in which the mobile cowl is close to the fixed cowl and a position of opening in which the mobile cowl is spaced from the fixed cowl towards a rear,
   a window delimited upstream by the fixed cowl and downstream by the mobile cowl, said window being open between a jet of a secondary flow and an outside of the nacelle,
   an outer thrust-reversing door having a median plane and mounted to be rotationally mobile about a first axis of rotation on the structure between a closed position in which the outer thrust-reversing door blocks the window and an open position in which the outer thrust-reversing door does not block the window, and
   a driving mechanism provided to coordinate a transition from the closed position to the open position of the outer thrust-reversing door with the transition from the position of closure to the position of opening of the mobile cowl and vice-versa, said driving mechanism comprising:
      a single power cylinder arranged at a level of the median plane, having a first end mounted articulated on the structure,
      a shaft having a shaft axis of rotation, parallel to the first axis of rotation and at a distance therefrom, and where a second end of the power cylinder is mounted articulated on the shaft,
      a first yoke joint secured to the outer thrust-reversing door and mounted to be free to rotate on the shaft about the third axis of rotation, and
      a second yoke joint secured to the mobile cowl and where each of two flanks of the second yoke joint has a groove in each of which the shaft is mounted to slide parallel to the median plane.

2. The nacelle according to claim 1, wherein, for each of the grooves, the shaft bears a wheel which rolls in said groove.

3. The nacelle according to claim 1, wherein the outer thrust-reversing door has, at the level of the median plane, a void in which the power cylinder lodges in the closed position of the outer thrust-reversing door.

4. The nacelle according to claim 1, further comprising blocking means arranged to prevent the outer thrust-reversing door from exceeding a maximum position of opening.

5. The nacelle according to claim 1, further comprising an inner thrust-reversing door arranged inside the nacelle relative to the outer thrust-reversing door and mounted to be rotationally mobile about a second axis of rotation on the structure between a retracted position in which the inner thrust-reversing door is positioned around the jet and an active position in which the inner thrust-reversing door is positioned across the jet, wherein the driving mechanism comprises two guideways secured to the inner thrust-reversing door and which extend parallel to the direction of translation of the mobile cowl when the inner thrust-reversing door is in the retracted position, wherein each of the guideways has a distal end oriented towards a front of the nacelle and a proximal end oriented towards the rear of the nacelle, and wherein the driving mechanism comprises, for each of the guideways, a runner secured to the mobile cowl and provided to be able to be displaced in the guideway between the distal end and the proximal end.

6. The nacelle according to claim 5, wherein the inner thrust-reversing door has, at a level of its median plane, a notch which allows passage of the power cylinder.

7. A dual-flow turbojet engine comprising an interior engine and a nacelle according to claim 1 surrounding the interior engine, and wherein the jet of the secondary flow is delimited between the nacelle and the interior engine.

8. An aircraft comprising at least one dual-flow turbojet engine according to claim 7.

* * * * *